(12) United States Patent
Rossiello et al.

(10) Patent No.: US 12,072,841 B2
(45) Date of Patent: Aug. 27, 2024

(54) KEYPHRASE GENERATION LEVERAGING PUBLIC REPOSITORY CATEGORIES

(71) Applicant: International Business Machines Corporation, Armonk, NY (US)

(72) Inventors: Gaetano Rossiello, Brooklyn, NY (US); Md Faisal Mahbub Chowdhury, Woodside, NY (US); Alfio Massimiliano Gliozzo, Brooklyn, NY (US); Nandana Mihindukulasooriya, Cambridge, MA (US); Michael Robert Glass, Bayonne, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/054,984

(22) Filed: Nov. 14, 2022

(65) Prior Publication Data
US 2024/0160607 A1    May 16, 2024

(51) Int. Cl.
G06F 16/16    (2019.01)
G06F 16/14    (2019.01)
G06N 20/00    (2019.01)

(52) U.S. Cl.
CPC ............ *G06F 16/16* (2019.01); *G06F 16/148* (2019.01); *G06N 20/00* (2019.01)

(58) Field of Classification Search
None
See application file for complete search history.

(56) References Cited

U.S. PATENT DOCUMENTS 9,171,267 B2    10/2015    Ocke et al.
9,342,590 B2    5/2016    Karidi et al.
(Continued)

FOREIGN PATENT DOCUMENTS

CN    102591920 B    11/2013
CN    107832418 A    3/2018
CN    108459874 B    3/2021

OTHER PUBLICATIONS

Meng, et al., "An Empirical Study on Neural Keyphrase Generation," arXiv:2009.10229v3 [cs.CL] Apr. 15, 2021.
(Continued)

*Primary Examiner* — Kim T Nguyen
(74) *Attorney, Agent, or Firm* — Amin, Turocy & Watson, LLP

(57) ABSTRACT

One or more systems, devices, computer program products and/or computer-implemented methods of use provided herein relate to a process for generating the classification of files to allow for file system organization and/or query augmentation. A system can comprise a memory that stores computer executable components, and a processor that executes the computer executable components stored in the memory, wherein the computer executable components can comprise a generating component that generates a keyphrase based on a context derived from evaluation of an input file, wherein the generating component employs a public repository of files annotated with a plurality of keyphrases, including the keyphrase, to generate the keyphrase based on the context, and an execution component that classifies the input file based on the keyphrase. In one or more embodiments, the input file can comprise a query, and classification of the input file can comprise augmenting the query based on the keyphrase.

20 Claims, 10 Drawing Sheets

(56) References Cited

U.S. PATENT DOCUMENTS

| | | | |
|---|---|---|---|
| 9,990,368 B2* | 6/2018 | Walid | G06F 16/148 |
| 10,402,061 B2 | 9/2019 | Kohlmeier et al. | |
| 10,628,496 B2 | 4/2020 | Babu | |
| 10,885,275 B2 | 1/2021 | Gee | |
| 10,936,630 B2 | 3/2021 | Ronen et al. | |
| 11,030,394 B1 | 6/2021 | Kozareva | |
| 11,093,687 B2 | 8/2021 | Kesin et al. | |
| 11,537,950 B2* | 12/2022 | Bui | G06N 20/00 |
| 2013/0246386 A1 | 9/2013 | Gherman et al. | |
| 2015/0261773 A1* | 9/2015 | Walid | G06F 16/345 |
| | | | 707/769 |
| 2015/0381526 A1 | 12/2015 | Beaty et al. | |
| 2017/0164011 A1 | 6/2017 | Rimon et al. | |
| 2017/0364586 A1 | 12/2017 | Krishnamurthy et al. | |
| 2018/0046763 A1* | 2/2018 | Price, Jr. | G16H 70/60 |
| 2019/0155944 A1 | 5/2019 | Mahata | |
| 2020/0207087 A1 | 7/2020 | Tanaka et al. | |
| 2021/0004439 A1 | 1/2021 | Xiong | |
| 2021/0109959 A1 | 4/2021 | Odellia | |
| 2021/0134173 A1 | 5/2021 | Yuan | |
| 2021/0151038 A1* | 5/2021 | Manjunath | G10L 15/1815 |
| 2021/0240939 A1 | 8/2021 | Walters | |
| 2021/0326636 A1 | 10/2021 | Mihindukulasooriya et al. | |
| 2021/0406444 A1 | 12/2021 | Vontobel | |
| 2022/0004712 A1 | 1/2022 | Bahuleyan | |
| 2022/0114476 A1* | 4/2022 | Bui | G06N 3/044 |
| 2022/0253604 A1* | 8/2022 | Yang | G06F 40/284 |
| 2022/0374600 A1* | 11/2022 | Cheng | G06F 40/284 |
| 2023/0091076 A1* | 3/2023 | Yang | G06N 5/02 |
| | | | 704/9 |
| 2023/0282018 A1* | 9/2023 | Basu | G06V 30/19113 |
| | | | 382/181 |

OTHER PUBLICATIONS

Swaminathan, et al., "A preliminary exploration of GANs for keyphrase generation," In Proceedings of the 2020 Conference on Empirical Methods in Natural Language Processing (EMNLP), Nov. 16-20, 2020, (pp. 8021-8030).

Ahmad, et al., "Select, extract and generate: Neural keyphrase generation with syntactic guidance," arXiv:2008.01739v2 [cs.CL] Jun. 4, 2021.

Luo, et al., "Sensenet: Neural keyphrase generation with document structure," arXiv:2012.06754v1 [cs.CL] Dec. 12, 2020.

Gallina, et al., "KPTimes: A large-scale dataset for keyphrase generation on news documents," arXiv:1911.12559, arXiv: 1911.12559v1 [cs.IR] Nov. 28, 2019.

Boudin, et al., "Keyphrase generation for scientific document retrieval," arXiv preprint arXiv:2106.14726, Proceedings of the 58th Annual Meeting of the Association for Computational Linguistics, pp. 1118-1126 Jul. 5-10, 2020.

Cano, et al., "Keyphrase generation: A multi-aspect survey," In 2019 25th Conference of Open Innovations Association (FRUCT) (pp. 85-94). IEEE.

Lewis, et al., "BART: Denoising Sequence-to-Sequence Pre-training for Natural Language Generation, Translation, and Comprehension," arXiv:1910.13461v1 [cs.CL] Oct. 29, 2019.

Chowdhury, et al., "Applying a Generic Sequence-to-Sequence Model for Simple and Effective Keyphrase Generation," implementarXiv: 2201.05302v1 [cs.CL] Jan. 14, 2022.

Sun, et al., "Breaking Cycles in Noisy Hierarchies," WebSci '17, Jun. 25-28, 2017, Troy, NY, USA. © 2017, DOI: httpp://dx.doi.org/10.1145/3091478.3091495.

Bennani-Smires, et al., "EmbedRank: Unsupervised Keyphrase Extraction using Sentence Embeddings," arXiv:1801.04470v2 [cs.CL] Feb. 19, 2018.

Chen, et al., "Exclusive Hierarchical Decoding for Deep Keyphrase Generation," Proceedings of the 58th Annual Meeting of the Association for Computational Linguistics, pp. 1095-1105 Jul. 5-10, 2020.

Zhang, et al., "Keyphrase Generation Based On Deep Seq2seq Model," Date of Publication: Aug. 16, 2018, DOI: 10.1109/ACCESS. 2018.2865589.

Park, et al., "KPDROP: An Approach To Improving Absent Keyphrase Generation," arXiv:2112.01476v3 [cs.CL] Oct. 24, 2022.

Yuan, et al., "One Size Does Not Fit All: Generating and Evaluating Variable Number of Keyphrases," arXiv:1810.05241v4 [cs.CL] May 12, 2020.

Ye, et al., "ONE2SET: Generating Diverse Keyphrases As A Set," rXiv:2105.11134v1 [cs.CL] May 24, 2021.

Boudin, et al., "Redefining Absent Keyphrases And Their Effect On Retrieval Effectiveness," arXiv:2103.12440v2 [cs.IR] Apr. 2, 2021.

Ahmad, et al., "Select, Extract And Generate: Neural Keyphrase Generation With Layer-Wise Coverage Attention," Proceedings of the 59th Annual Meeting of the Association for Computational Linguistics and the 11th International Joint Conference on Natural Language Processing, pp. 1389-1404 Aug. 1-6, 2021.

Shen, et al., "Unsupervised Deep Keyphrase Generation," arXiv:2104.08729v1 [cs.CL] Apr. 18, 2021.

Bennani-Smires, et al., "EmbedRank: Unsupervised Keyphrase Extraction using Sentence Embeddings," arXiv:1801.04470v3 [cs.CL] Sep. 5, 2018.

Non-Final Office Action received for U.S. Appl. No. 17/986,117, dated Jun. 21, 2024, 90 pages.

* cited by examiner

EXEMPLARY USES 820

- FILE ORGANIZATION
- QUERY AUGMENTATION 292
- QUALITY POLICY ALIGNMENT
- STORAGE POLICY ALIGNMENT
- INCREASED STORAGE EFFICIENCY
- GLOBALLY-ACCEPTED (E.G., ORGANIZATION-WIDE) KEYPHRASES
- SINGLE POINT OF CLASSIFICATION
- TREND DETECTION

OUTPUT KEYPHRASE 280

FIG. 8

KEYPHRASE GENERATION LEVERAGING PUBLIC REPOSITORY CATEGORIES

TECHNICAL FIELD

The present disclosure relates to classification of files, and more specifically to employing a public repository for generating the classification of files to allow for file system organization and/or query augmentation.

BACKGROUND

File systems comprising large quantities of files, such as large quantities of documents, can generally use a plurality of classification systems, lacking a global classification system, for classifying and thus organizing files. Often, files can be not classified at all, leading to difficulty globally searching, organizing and/or efficiently storing the files of such file system.

SUMMARY

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments described herein, systems, computer-implemented methods, apparatuses and/or computer program products can provide a process to classify a subset of files, such as documents. As used herein, classification can refer to auto-tagging and/or labeling, which can be used for organization, policy-based storage, trend detection and/or a range of other purposes.

As used herein, auto-tagging can refer to automatic tagging of files, such as documents, to provide a labeling of those files. As used herein, trend detection can refer to detecting how a file, such as a document, can evolve over time and/or how a program, application, virus, etc. evolves over time based on related files.

In accordance with an embodiment, a system can comprise a memory that stores computer executable components, and a processor that executes the computer executable components stored in the memory, wherein the computer executable components can comprise a generating component that generates a keyphrase based on a context derived from evaluation of an input file, wherein the generating component employs a public repository of files annotated with a plurality of keyphrases, including the keyphrase, to generate the keyphrase based on the context, and an execution component that classifies the input file based on the keyphrase.

As used herein, a keyphrase can be a salient term, descriptive phrase and/or category used for searching, ranking, classifying and/or organizing a file, which keyphrase need not be explicitly indicated at data and/or metadata of a file.

An advantage of the above-indicated system can be providing for more reliable and globally accepted file classification based on readily available, free, and public keyphrase sets. Such framework can allow for quicker and more reliable training of a keyphrase generation model, while providing a training set of sufficient size.

Another advantage of the above-indicated system can be generation of a keyphrase for which the keyphrase itself is not in the input file.

In one or more embodiments of the aforementioned system, the public repository of files can comprise or be comprised by an internet encyclopedic website. An advantage of this feature can be readily available, free, and public data for use in generating keyphrases.

In one or more embodiments, the input file can comprise a query, and classification of the input file can comprise augmenting the query based on the keyphrase. An advantage of these features can be streamlining of querying based on a widely used classification framework.

In accordance with another embodiment, a computer-implemented method can comprise generating, by a system operatively coupled to a processor, a keyphrase based on a context derived from evaluation of an input file, employing, by the system, a public repository of files annotated with a plurality of keyphrases, including the keyphrase, to generate the keyphrase based on the context, and classifying, by the system, the input file based on the keyphrase.

An advantage of the above-indicated computer-implemented method can be providing for more reliable and globally accepted file classification based on readily available, free, and public keyphrase sets. Such framework can allow for quicker and more reliable training of a keyphrase generation model, while providing a training set of sufficient size.

Another advantage of the above-indicated method can be generation of a keyphrase for which the keyphrase itself is not in the input file.

In one or more embodiments of the aforementioned computer-implemented method, the public repository of files can comprise or be comprised by an internet encyclopedic website. An advantage of this feature can be readily available, free, and public data for use in generating keyphrases.

In one or more embodiments, the input file can comprise a query, and classification of the input file can comprise augmenting the query based on the keyphrase. An advantage of these features can be streamlining of querying based on a widely used classification framework.

In accordance with yet another embodiment, a computer program product providing a process to automatically port source code can comprise a computer readable storage medium having program instructions embodied therewith, the program instructions executable by a processor to cause the processor to generate, by the processor, a keyphrase based on a context derived from evaluation of an input file, employ, by the processor, a public repository of files annotated with a plurality of keyphrases, including the keyphrase, to generate the keyphrase based on the context, and classify, by the processor, the input file based on the keyphrase.

An advantage of the above-indicated computer program product can be providing for more reliable and globally accepted file classification based on readily available, free, and public keyphrase sets. Such framework can allow for quicker and more reliable training of a keyphrase generation model, while providing a training set of sufficient size.

Another advantage of the above-indicated computer program product can be generation of a keyphrase for which the keyphrase itself is not in the input file.

In one or more embodiments of the aforementioned computer program product, the public repository of files can comprise or be comprised by an internet encyclopedic website. An advantage of this feature can be readily available, free, and public data for use in generating keyphrases.

In one or more embodiments, the input file can comprise a query, and classification of the input file can comprise augmenting the query based on the keyphrase. An advantage of these features can be streamlining of querying based on a widely used classification framework.

DESCRIPTION OF THE DRAWINGS

FIG. 8 a set of inputs and outputs of the non-limiting system of FIG. 2, in accordance with one or more embodiments described herein.

DETAILED DESCRIPTION

Figure 1:
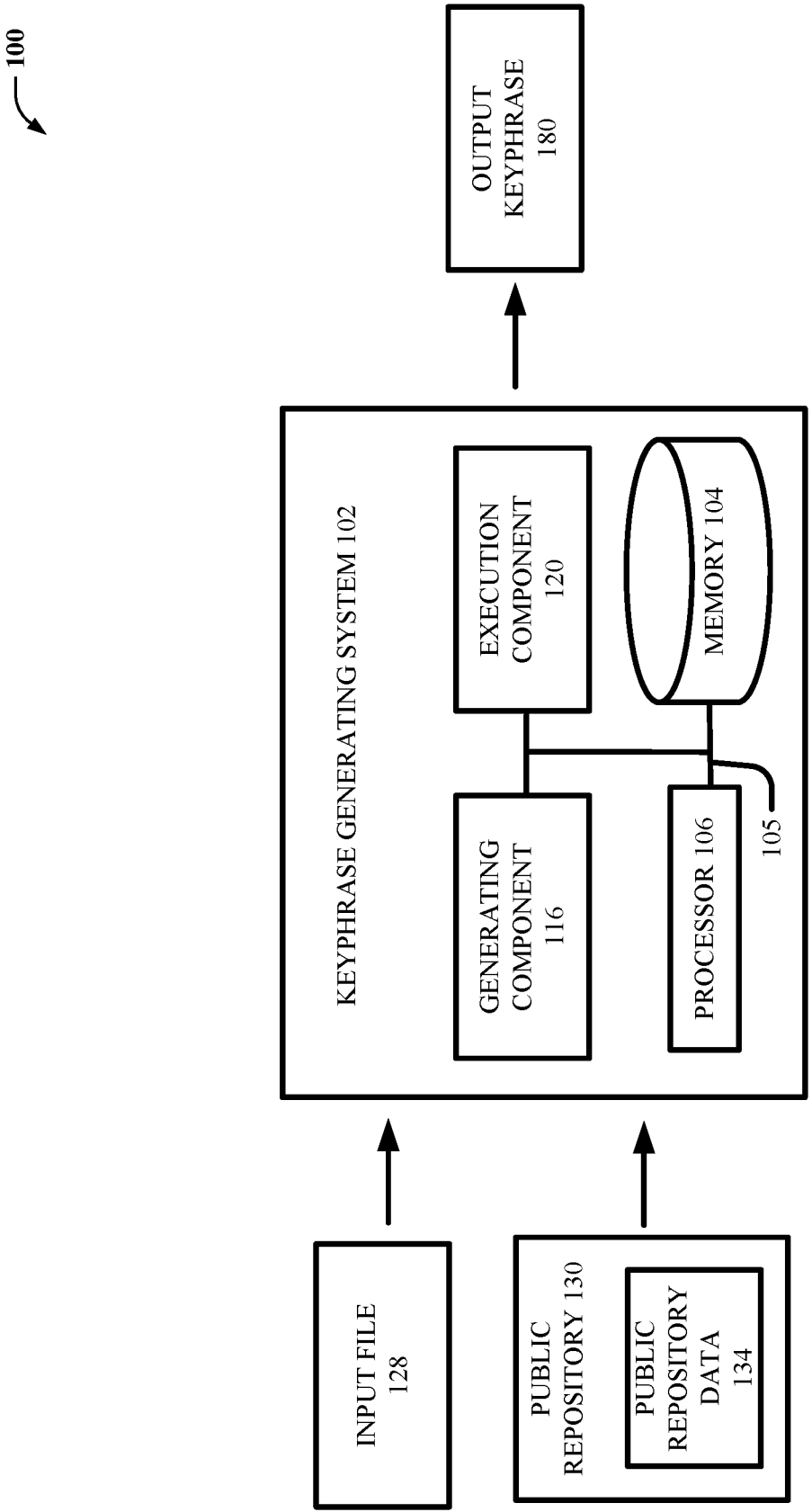
FIG. 1 illustrates a block diagram of an example, non-limiting system that can provide a process to classify an input file based on public repository data, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Generally, keyphrases can be a collection of salient terms that can summarize an input file, such as a document. Keyphrase generation (KPG) can be different from other natural language generation (NLG) tasks since the target model prediction of a KPG can be to generate multiple sequences (e.g., a set of multi-word phrases), rather than a single sequence as with NLG.

Existing keyphrase generation frameworks can employ natural language processing (NLP), deep learning (DL) models and/or relation linking. However, these existing frameworks can require large training sets that must be determined, identified and/or generated from scratch. Often such training data sets are simply unavailable. These existing frameworks also can be domain-based and/or department-based, and thus can be non-representative of term-usage throughout an entire unit, firm, company and/or total set of users.

To account for one or more of these deficiencies of existing frameworks, one or more embodiments are described herein that differently can employ a public repository of data having annotated and/or assigned categories available for use in training an analytical model. In one or more embodiments, one or more additional categories can be generated based on the data of the public repository. Based on the categories, employed as keyphrases, the one or more embodiments described herein can classify an input file or set of input files. That is, the input file can be classified based on a globally accepted (e.g., by a total set of users) classification schemes based on the public repository. This is in comparison to use of varying classification schemes by a set of users, which varying classification schemes can have varying terminology, meanings and/or languages.

Generally, an embodiment described herein can employ a public repository, such as comprised by and/or comprising an internet encyclopedic website and its corresponding data (e.g., including metadata). The data, including extracted categories, can be employed to train an analytical model to generate the categories upon evaluation of data subsets (e.g., pages) of the public repository. That is, the data subset (e.g., pages) of the public repository can be employed to train the analytical model as test data.

Indeed, based on the use of the public repository, a large set of training data can be rapidly extracted and/or generated, such as absent user entity knowledge of all aspects, domains and/or categories of the respective training data. The categories can be generated from the public repository even if the categories are not explicitly mentioned in the data (e.g., including metadata) of the public repository. Further, keyphrase generation employing the one or more frameworks described herein can be zero-shot approaches, such as where fine tuning of an analytical model for a corpus, concept and/or domain of information is not needed. This can be at least in part due to the use of the public repository.

Prior to employing the data of the public repository, the data can be cleaned, such as to assign category types to the data, remove extraneous categories, remove categories that are inconsistent with a category hierarchy employed by the public repository and/or to rank the categories based on informative scores based on type statistics for each category. As used herein, a type can be based on any suitable organizational hierarchy for the categories, such as extracted form the public repository. Exemplary types can comprise, locations, geographies, names, dates, albums, depending on the subject matter of the data being evaluated from the public repository. Exemplary type statistics can comprise quantitative data such as use of a term, frequency of a term, data priority, etc. Here, example type statistics used can comprise number of types, type diversity, average type distance and/or maximum type distance. As used herein, an exemplary public repository can comprise Wikipedia® and/or Infoplease®.

Upon storing of the trained analytical model, the analytical model can be retrieved and employed to classify one or more input files as indicated above. The classification can be based on ranking of keyphrases that can be generated based on context derived from the one or more input files. The keyphrases can be generated from the one or more input files even if the keyphrases are not explicitly mentioned in the data (e.g., including metadata) of the one or more input files.

The classification can comprise organizing of the input files, storing of the input files, aligning of the input files to one or more policies (e.g., quality and/or storage policies) and/or more generally labeling the input files based on a single classification scheme.

In one or more embodiments, an input file can comprise a query of any database, wherein the query can be augmented employing the keyphrase generation framework described herein. Based on the augmentation, the query can be modified to more particularly align to a database being searched.

In one or more embodiments, the classifying can be employed for one or more trend detection purposes. For example, trend detection can refer to detecting how an input file, such as a document, can evolve over time and/or how a program, application, virus, etc. evolves over time based on related files.

As used herein, the term "cost" can refer to money, power, memory, bandwidth, time and/or manual labor.

As used herein, the terms "entity," "requesting entity." and "user entity" can refer to a machine, device, component, hardware, software, smart device and/or human.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100 and/or 200 illustrated at FIGS. 1 and 2, and/or systems thereof, can further comprise one or more computer and/or computing-based elements described herein with reference to a computing environment, such as the computing environment 1000 illustrated at FIG. 10. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning now in particular to one or more figures, and first to FIG. 1, the figure illustrates a block diagram of an example, non-limiting system 100 that can facilitate a process to generate and employ a keyphrase, in accordance with one or more embodiments described herein.

The non-limiting system 100 can comprise a keyphrase generating system 102, which can be associated with a cloud computing environment. The keyphrase generating system 102 can comprise one or more components, such as a memory 104, processor 106, bus 105, generating component 116 and/or execution component 120. Generally, keyphrase generating system 102, and thus non-limiting system 100, can facilitate use of public repository data 134 of a public repository 130 to output an output keyphrase 180 for classifying an input file 128.

The generating component 116 can generate a keyphrase based on a context derived from evaluation of the input file 128. The generating component 116 can employ the public repository 10 of files annotated with a plurality of keyphrases (e.g., as employed to train an analytical model used by the generating component 116), including the keyphrase, to generate the output keyphrase 280 based on the context. The execution component 120 can classify the input file 228 based on the output keyphrase 280. Classification can comprise using the keyphrase to organize, arrange, align, modify and/or augment the input file, one or more second input files relative to the input file and/or a system that uses and/or comprises the input file.

Figure 2:
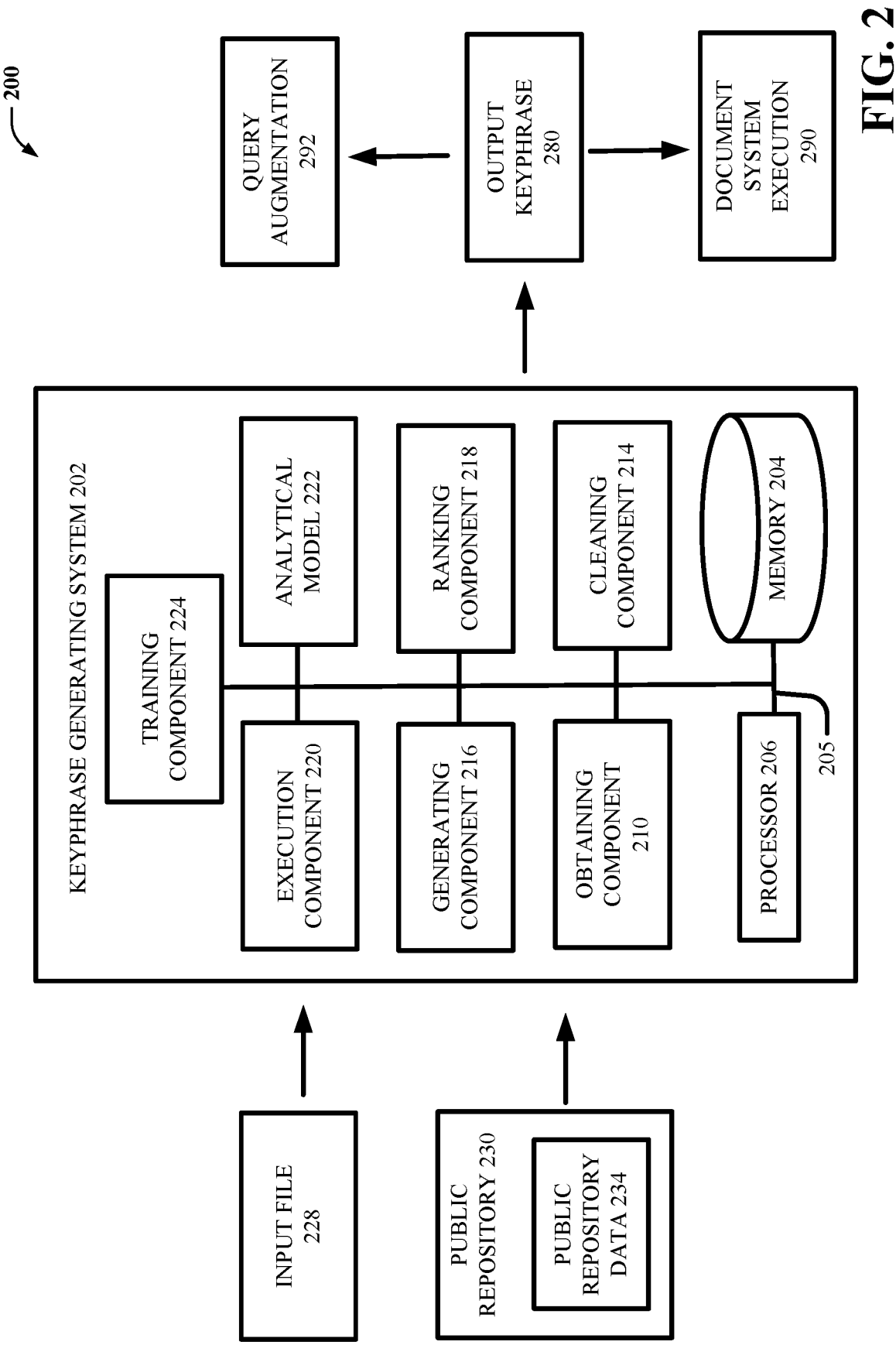
FIG. 2 illustrates a block diagram of another example, non-limiting system that can provide a process to classify an input file based on public repository data, in accordance with one or more embodiments described herein.

Turning next to FIG. 2, a non-limiting system 200 is illustrated that can comprise a keyphrase generating system 202. Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

One or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The keyphrase generating system 202 can be associated with, such as accessible via, a cloud computing environment.

The keyphrase generating system 202 can comprise a plurality of components. The components can comprise a memory 204, processor 206, bus 205, obtaining component 210, cleaning component 214, generating component 216, ranking component 218, execution component 220, analytical model 222 and/or training component 224.

Generally, the keyphrase generating system 202 can facilitate use of public repository data 234 of a public repository 230 to output an output keyphrase 280 for classifying an input file 228. The keyphrase generating system 202 can generally rank one or more keyphrases generated based on context data extracted from the input file 228 and determine the output keyphrase 280 based on the ranking.

Discussion first turns briefly to the processor 206, memory 204 and bus 205 of the keyphrase generating system 202. For example, in one or more embodiments, the keyphrase generating system 202 can comprise the processor 206 (e.g., computer processing unit, microprocessor, classical processor, quantum processor and/or like processor). In one or more embodiments, a component associated with keyphrase generating system 202, as described herein with or without reference to the one or more figures of the one or more embodiments, can comprise one or more computer and/or machine readable, writable and/or executable components and/or instructions that can be executed by processor 206 to provide performance of one or more processes defined by such component and/or instruction. In one or more embodiments, the processor 206 can comprise the obtaining component 210, cleaning component 214, generating component 216, ranking component 218, execution component 220, analytical model 222 and/or training component 224.

In one or more embodiments, the keyphrase generating system 202 can comprise the computer-readable memory 204 that can be operably connected to the processor 206. The memory 204 can store computer-executable instructions that, upon execution by the processor 206, can cause the processor 206 and/or one or more other components of the keyphrase generating system 202 (e.g., obtaining component 210, cleaning component 214, generating component 216, ranking component 218, execution component 220, analytical model 222 and/or training component 224) to perform one or more actions. In one or more embodiments, the memory 204 can store computer-executable components (e.g., obtaining component 210, cleaning component 214, generating component 216, ranking component 218, execution component 220, analytical model 222 and/or training component 224).

The keyphrase generating system 202 and/or a component thereof as described herein, can be communicatively, electrically, operatively, optically and/or otherwise coupled to one another via a bus 205. Bus 205 can comprise one or more of a memory bus, memory controller, peripheral bus, external bus, local bus, quantum bus and/or another type of bus that can employ one or more bus architectures. One or more of these examples of bus 205 can be employed.

In one or more embodiments, the keyphrase generating system 202 can be coupled (e.g., communicatively, electrically, operatively, optically and/or like function) to one or more external systems (e.g., a non-illustrated electrical output production system, one or more output targets and/or an output target controller, sources and/or devices (e.g., classical and/or quantum computing devices, communication devices and/or like devices), such as via a network. In one or more embodiments, one or more of the components of the keyphrase generating system 202 and/or of the non-limiting system 200 can reside in the cloud, and/or can reside locally in a local computing environment (e.g., at a specified location).

In addition to the processor 206 and/or memory 204 described above, the keyphrase generating system 202 can comprise one or more computer and/or machine readable, writable and/or executable components and/or instructions that, when executed by processor 206, can provide performance of one or more operations defined by such component and/or instruction.

Turning now to the additional components of the keyphrase generating system 202 (e.g., obtaining component 210, cleaning component 214, generating component 216, ranking component 218, execution component 220, analytical model 222 and/or training component 224), generally, the keyphrase generating system 202 can obtain, evaluate and use public repository data 234 to evaluate an input file 228 for which context data is obtained and evaluated by the keyphrase generating system 202.

Figure 3:
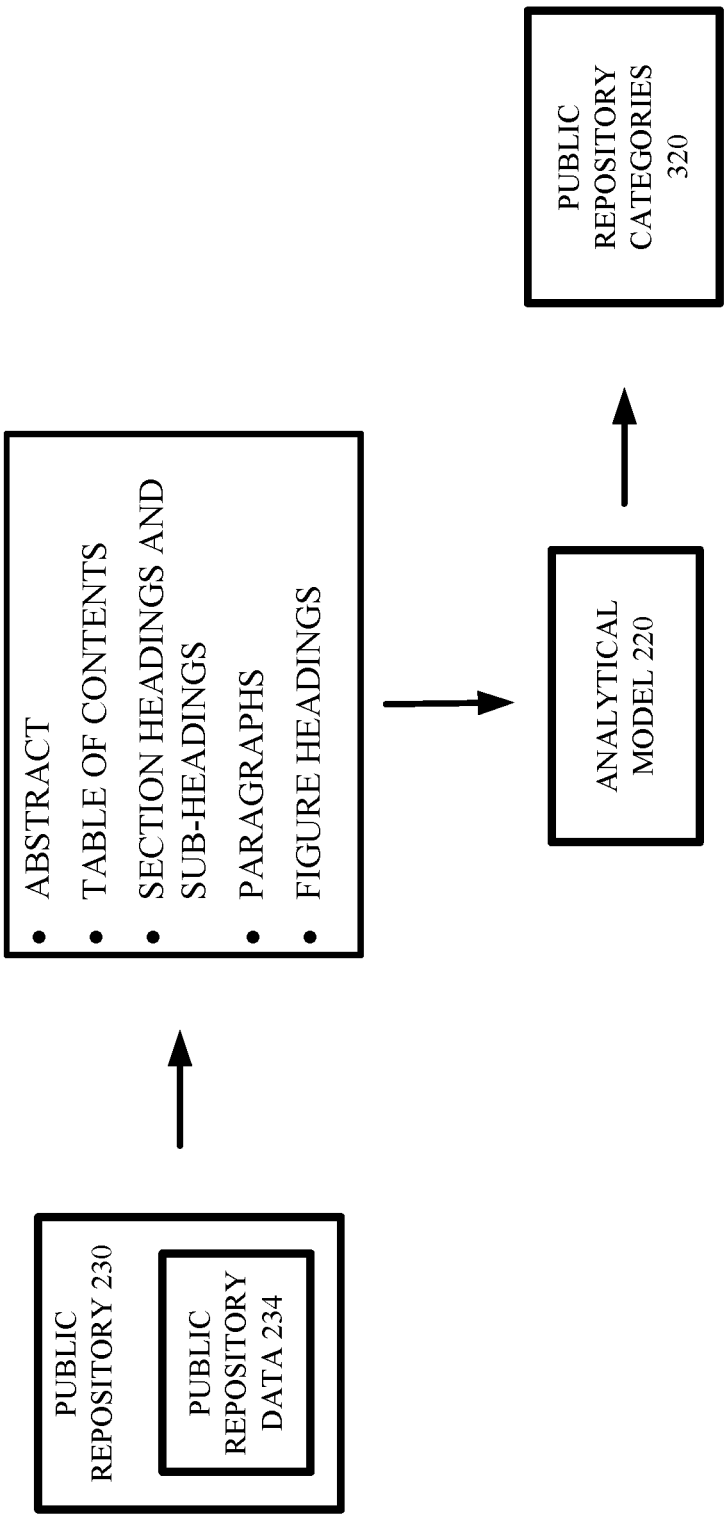
FIG. 3 illustrates a set of inputs and outputs of the non-limiting system of FIG. 2, in accordance with one or more embodiments described herein.

Turning first to the obtaining component 210 and to FIG. 3 in combination with FIG. 2, the obtaining component 210 can identify, search, receive, transfer and/or otherwise obtain the input file 228 and the public repository data 234. The public repository data 234 can comprise data and/or metadata in any suitable format. The public repository data 234 can comprise data from any one or more aspects 302 of a public repository 230, such as an internet or other digital encyclopedic repository and/or website. The aspects 302 can comprise one or more of an abstract, table of contents, section headings, section sub-headings, paragraphs and/or figure headings of one or more subsets of data (e.g., one or more pages) of the public repository 230. The obtaining of the public repository data 234 can comprise any suitable communication (e.g., as described above) over any local network, open-source network, wide area network and/or cloud. The obtaining can comprise extracting of data, tracing of data trees, read requests, etc.

The input file 228 can comprise data and/or metadata in any suitable format. Exemplary input files 228 can comprise one or more digital and/or digitized documents, queries, informative sources, tables, lists, code sets and/or matrices. The obtaining of the input file 228 can comprise receipt of a request or input of the input file 228, such as by a user entity, to the keyphrase generating system 202.

As further illustrated at FIG. 3, the aspects 302 of the public repository data 234 can be input to the analytical model 222, which can discern one or more public repository categories 320 (e.g., keyphrases) from the one or more aspects 302.

Figure 4:
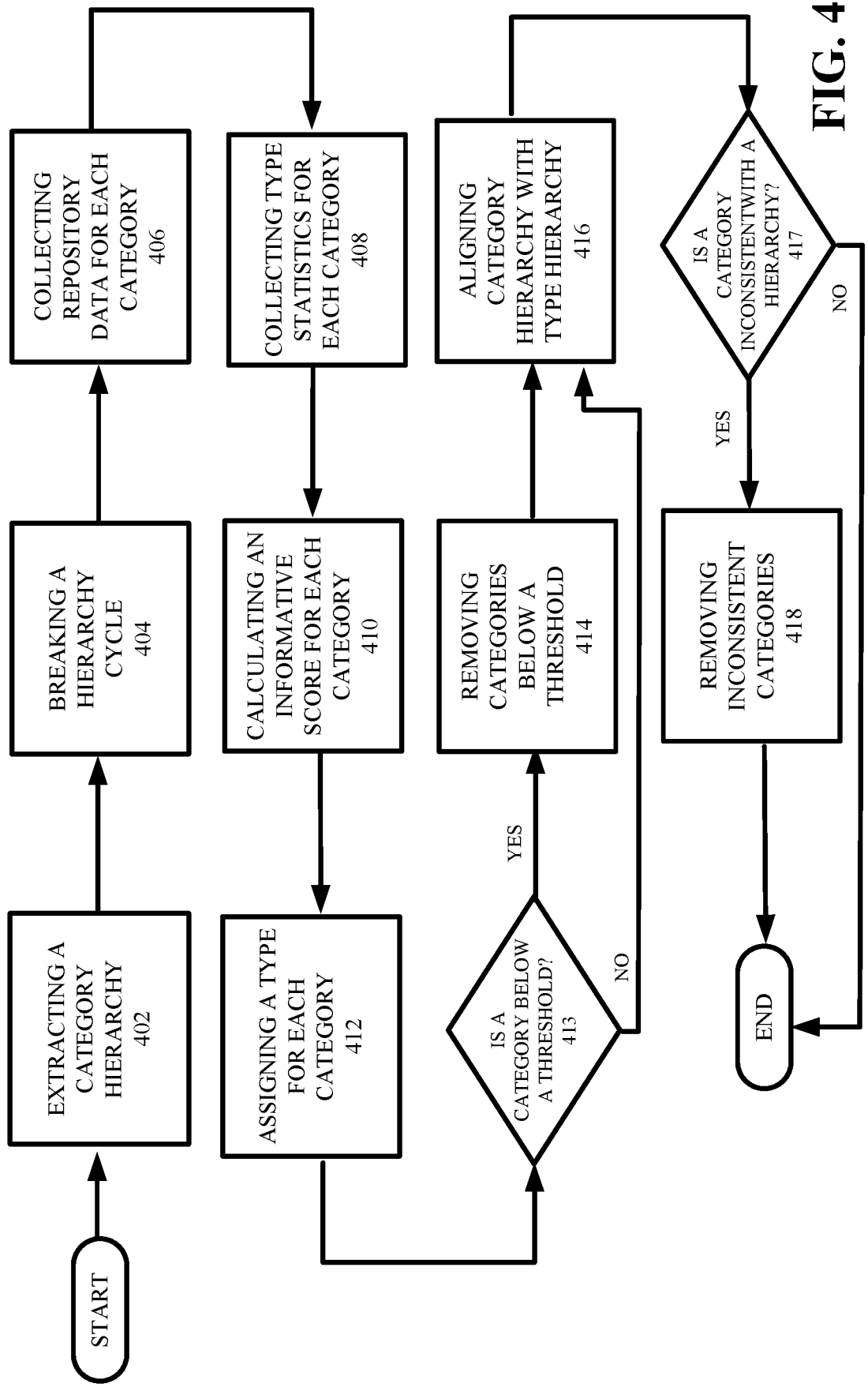
FIG. 4 illustrates a block flow diagram of example processes for cleaning of public repository data, employing the non-limiting system of FIG. 2, in accordance with one or more embodiments described herein.

Turning next to the cleaning component 214 and FIG. 4, along with still referring to FIG. 2, the cleaning component 214 generally can narrow, aggregate and evaluate the public repository data 234 to output the one or more public repository categories 320, which upon training of the analytical model 222, can be employed as and/or to generate keyphrases relative to one or more input files 228.

As illustrated at FIG. 4, a method 400 can comprise one or more operations that can be performed by the obtaining component 210 and cleaning component 214 to extract the public repository data 234 and to output the public repository categories 320, which can be employed by the analytical model 222 and training component 224 to train the analytical model 222, along with other public repository data 234.

At step 402, the obtaining component 210 can extract one or more category hierarchies from the public repository data 234. As indicated above, a hierarchy can be a representation of ordering as used by the public repository 230. A hierarchy can be multi-level and/or can be used for control and/or informative purposes by the public repository 230. That is, a hierarchy can be a logical structure, such as of a directed graph, providing for presentation of information in a logical order at the public repository 230. These hierarchies often can comprise taxonomies, ontologies and/or cycles, such as loops, which can refer back to different portions of a hierarchy, thus preventing a strict hierarchy. An example for a corpus of "computer" from a public repository 230 can comprise a hierarchy to group categories according to different criteria such as etymology, history, hardware, software, networking, unconventional uses, future uses, professions and organizations, notes, references, sources and/or external links. These aspects of this hierarchy itself can be categories, and further categories can be disposed within each of these higher-level categories.

As mentioned, the hierarchy can comprise one or more hierarchy cycles. The cleaning component 214 can break one or more of these hierarchy cycles at step 404 to provide a stricter (e.g., linear) hierarchy than was provided prior to breaking the one or more hierarchy cycles. In one or more embodiments, a Bayesian skill rating system can be employed for step 404 by the cleaning component 214. That is, in addition to identifying the hierarchies (e.g., logical orders) of the public repository 230, the cleaning component 214 also can modify one or more hierarchy cycles.

After breaking one or more hierarchy cycles at step 404, the method 400 can proceed to step 406 for collecting public repository data 234 for each of the determined categories. This additional public repository data 234 can comprise type statistics, and thus can comprise and/or lead to step 408 for collecting type statistics for each determined category by the cleaning component 214.

Relative to the public repositories discussed herein, a type can comprise an entity underlying a category of a public repository. Examples of types can be concepts such as generic concepts (e.g., organization, person, location, etc.) or more specific or fine-grained concepts (e.g., school, tennis player, or village).

As used herein, type statistics can comprise number of types, type diversity, average type distance and/or maximum type distance. As used herein, exemplary types can comprise sub-categories. The number of types refers to the number of distinct semantic types associated with each element of a given category. These types can form an ontology or taxonomy based on their hierarchical relationships. Type diversity can refer to a combination of average type distance and maximum type distance. Average type distance can be calculated by averaging the pairwise distance between all distinct types of a given category. Maximum type refers to the maximum of all pairwise distances between all distinct types of a given category.

At step 410, an informative score can be calculated for each determined category. Thereafter, the score can be normalized. The informative score can be based on one or more of the type statistics for the category.

Based on the informative scores for the categories from step 410, at step 412 the cleaning component 214 can assign at least one type to each category based on the calculated informative scores. For example, a type having a greatest informative score for a category can be defined as a major type for the category.

One or more additional processes that can be performed by the cleaning component 314 can comprise combining of categories, removing extraneous categories (e.g., having an informative score below a defined threshold) and/or dividing categories. For example, at step 413, the cleaning component 214 can determine whether a category has an informative score for a major type, which informative score is below a specified threshold. The threshold can be specified by default, by an administrating entity, and/or based on historical informative score data. Where the answer is yes, one or more categories can be removed from the resultant set of public repository categories 320, at step 414. Removal can comprise deletion from a list of categories based on the subset of public repository data being analyzed. Where the answer is no, the method 400 can proceed to step 416.

At step 416, the category hierarchy can be aligned with a type hierarchy, using the types assigned at step 412. This alignment can comprise aligning types with their respective categories.

At step 417, the cleaning component 214 can determine whether any one or more categories is inconsistent, such as with a type hierarchy or category hierarchy. Where the answer is yes, one or more inconsistent categories can be removed at step 418. Removal can comprise deletion from a list of categories based on the subset of public repository data being analyzed. Where the answer is no, the method 400 can end.

In view of the one or more processes described above as performed by the cleaning component 214, a resultant category hierarchy can be less noisy and/or have more informative categories than prior to the processes performed above. Further a resultant list of non-removed (e.g., non-deleted) public repository categories 320 can remain related to a subset of the public repository data 234.

Figure 5:
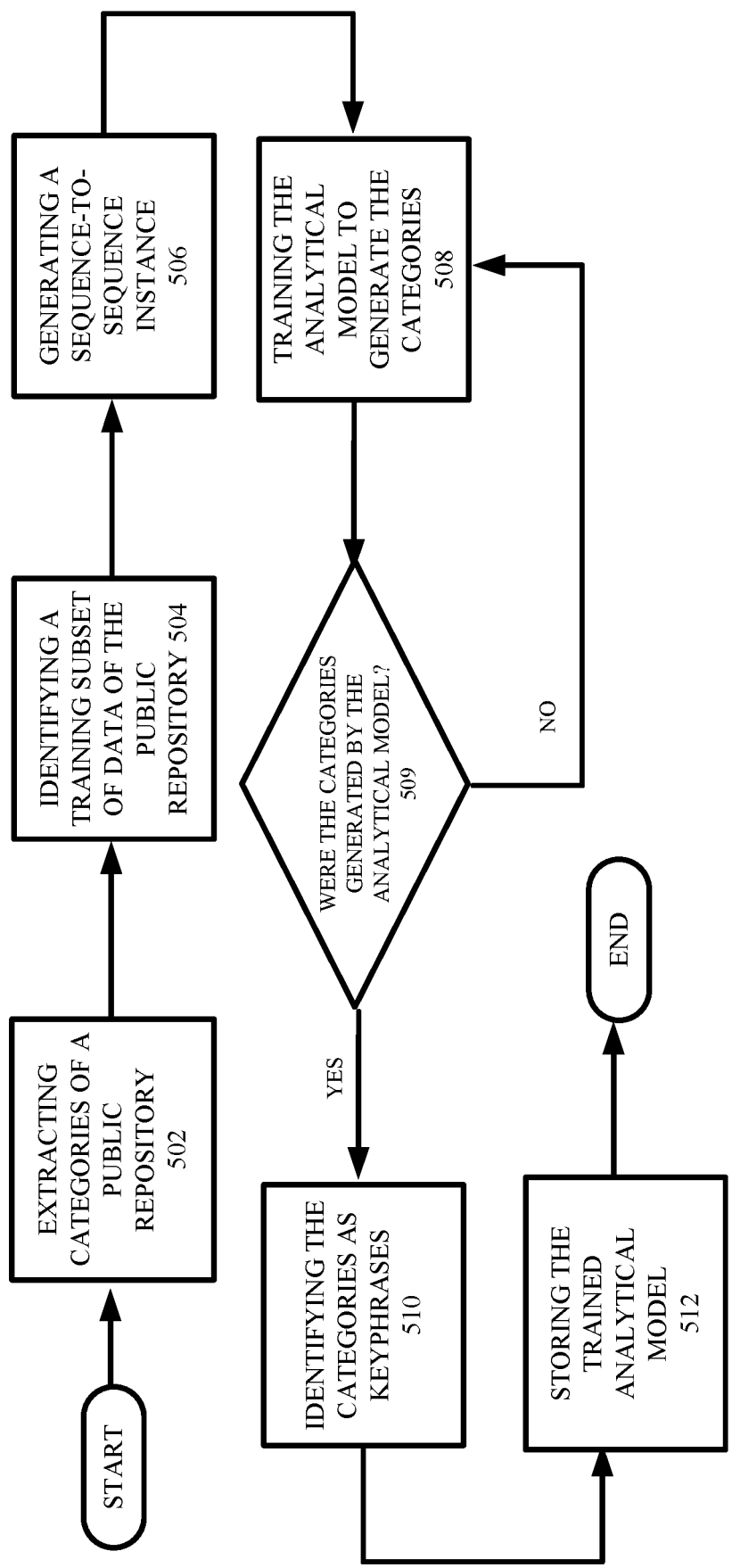
FIG. 5 illustrates a block flow diagram of example processes for training an analytical model, employing the non-limiting system of FIG. 2, in accordance with one or more embodiments described herein.

Discussion next turns to the analytical model 222, training component 224, FIG. 5, and also still to FIG. 2.

The resultant public repository categories 320 output from the or by the cleaning component 214 and the subset of the public repository data 234 on which the public repository categories 320 are based can be employed together to train the analytical model 222, such as by the training component 224.

The analytical model 222 can comprise and/or can be comprised by a classical model, predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, self-supervised, semi-supervised and/or unsupervised.

For example, the analytical model 222 can comprise and/or be comprised by a sequence-to-sequence (Seq2Seq) language model. As used herein, a Seq2Seq language model can refer to a class of recurrent neural network architectures that can be employed to solve language problems involving machine translation, question answering, chatbot generation and/or text summarization. That is, more generally, a Seq2Seq language model can convert a sequence (e.g., data) from one domain (e.g., input file context) to another domain (e.g., a corpus of keyphrases based on trained categories). With respect to the keyphrase generation system 202, the Seq2Seq language model can thus be employed to related input file context to one or more keyphrases based on the categories on which the Seq2Seq language model can be trained.

In one or more embodiments, the analytical model 222 can comprise a bidirectional auto-regressive transformer (BART), which can be a denoising autoencoder built with a Seq2Seq model that can be applicable to a range of end tasks. A BART can be trained by learning a model to reconstruct original text from training data comprising corrupted text, e.g., with a noising function.

In another embodiment, the analytical model 222 can comprise a transformer-based language model, which can be a type of Seq2Seq model. As used herein, a transformer can be a deep learning model that can adopt a mechanism of self-attention and can assign different weights to varying parts of an input dataset.

Generally, the analytical model 222 can be trained, such as by the training component 224, on a set of training data (e.g., that output by the obtaining component 210 and cleaning component 214 as discussed above) that can represent the type of data for which the keyphrase generating system 202 will be used. Checks of the analytical model 222, such as relative to data, categories, types and/or input files upon which the analytical model 222 has not yet been trained can be performed periodically and/or at any other frequency. Re-training of the analytical model 222 can be performed employing up-to-date data collected by the obtaining component 210 and/or cleaning component 214, such as over a specified time window.

In one or more embodiments, further training and/or fine-tuning of the analytical model 222 can be executed by the training component 224, such as using existing knowledge data sources, corpus and/or domain documents, known associated tags/keywords and/or weakly supervised training using bootstrapping from other unsupervised and conventional keyphrase extraction methods, as discussed above.

As further summary, and as illustrated at FIG. 5, analytical model training 500 can comprise one or more steps that can be performed initially by the obtaining component 210 and cleaning component 214, as discussed above, and then further by the training component 224.

Extracting of categories of a public repository can be performed at step 502 by the obtaining component 210. At step 504, a training subset of data 234 of the public repository 230 can be performed, such as by the training component 224. As discussed above, this training subset of data 234 can have one or more public repository categories 320 associated with the training subset of data 234.

At step 506, the analytical model 222, based on the training subset of data 234, can generate a Seq2Seq instance with which the analytical model 222 can be trained by the training component 224 to generate the respective and corresponding categories (e.g., the public repository categories 320) at step 508.

At step 509, the training component 224 can determine whether the correct categories were generated by the analytical model 222 (e.g., the corresponding public repository categories 320 output by the cleaning component 214 which correspond to the selected training subset of data 234. Where the answer is yes, the method 500 can proceed to step 510. Where the answer is no, the method 500 can proceed back to step 508 for additional training of the analytical model 222 to generate the proper and corresponding categories.

At step 510, the categories can be identified as the keyphrases that can be employed relative to one or more input files 228 and stored relative to the trained analytical model 222, which also can be stored at step 512.

Discussion now turns to further use of the keyphrase generating system 202 and use of the trained analytical model 222, by the generating component 216 and/or ranking component 218, for evaluating an input file 228, ranking one or more keyphrases related to the input file 228, and/or assigning an output keyphrase 280 for the input file 228.

Figure 6:
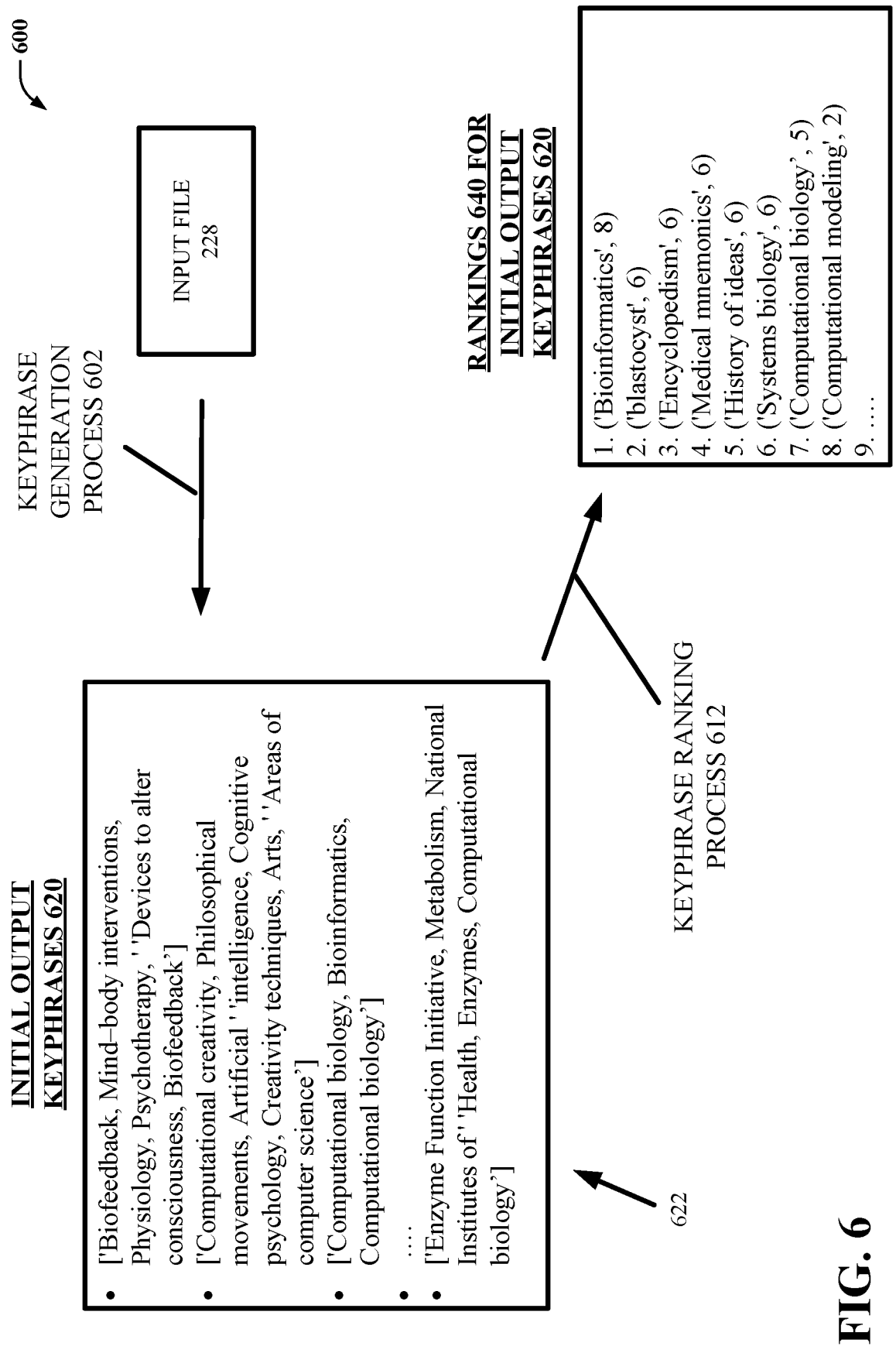
FIG. 6 depicts a set of inputs and outputs of the non-limiting system of FIG. 2, in accordance with one or more embodiments described herein.

That is, as illustrated at FIG. 6, an input file 228 can be obtained by the obtaining component 210 and transmitted to the generating component 216 and/or analytical model 222. A keyphrase generation process 602 can be performed, using the trained analytical model 222. More particularly, the generating component 216 can generate a set of keyphrases based on context derived from the evaluation of the input file 228. The generating component 216 can perform the derivation of the context from the input file 228. The context can comprise data and/or metadata and does not need to comprise any particular keyphrase explicitly. The context can comprise an entire set of words in the text given as input to the keyphrase generation system 202. The derivation performed by the generating component 216 can comprise searching, evaluating, and/or deconstructing the input file 228.

The generating of the keyphrases performed by the generating component 216 and analytical model 222 can comprise splitting the content of the input file 228 into subparts, and relating, using the trained Seq2Seq model terms, phrases and/or other data/metadata of the subparts to one or more keyphrases on which the Seq2Seq model can be trained.

As illustrated at FIG. 6, the initial output keyphrases 620 can be plentiful and aggregated into a list 622 by the generating component 216. The list 622 of initial output keyphrases 620 can be employed by the ranking component 218 to perform a keyphrase ranking process 612, resulting in rankings 640 for the output keyphrases 620. The rankings 640 can in turn be employed by the generating component 216 to output a final output keyphrase 280. As illustrated at FIG. 6, rankings can comprise numbers ranged between 1 and 10 and/or any other numeric and/or non-numeric ranking system. Generally, a keyphrase having a highest ranking can be selected by the generating component 216 as the output keyphrase 280 by which the execution component 220 can classify the input file 228.

Figure 7:
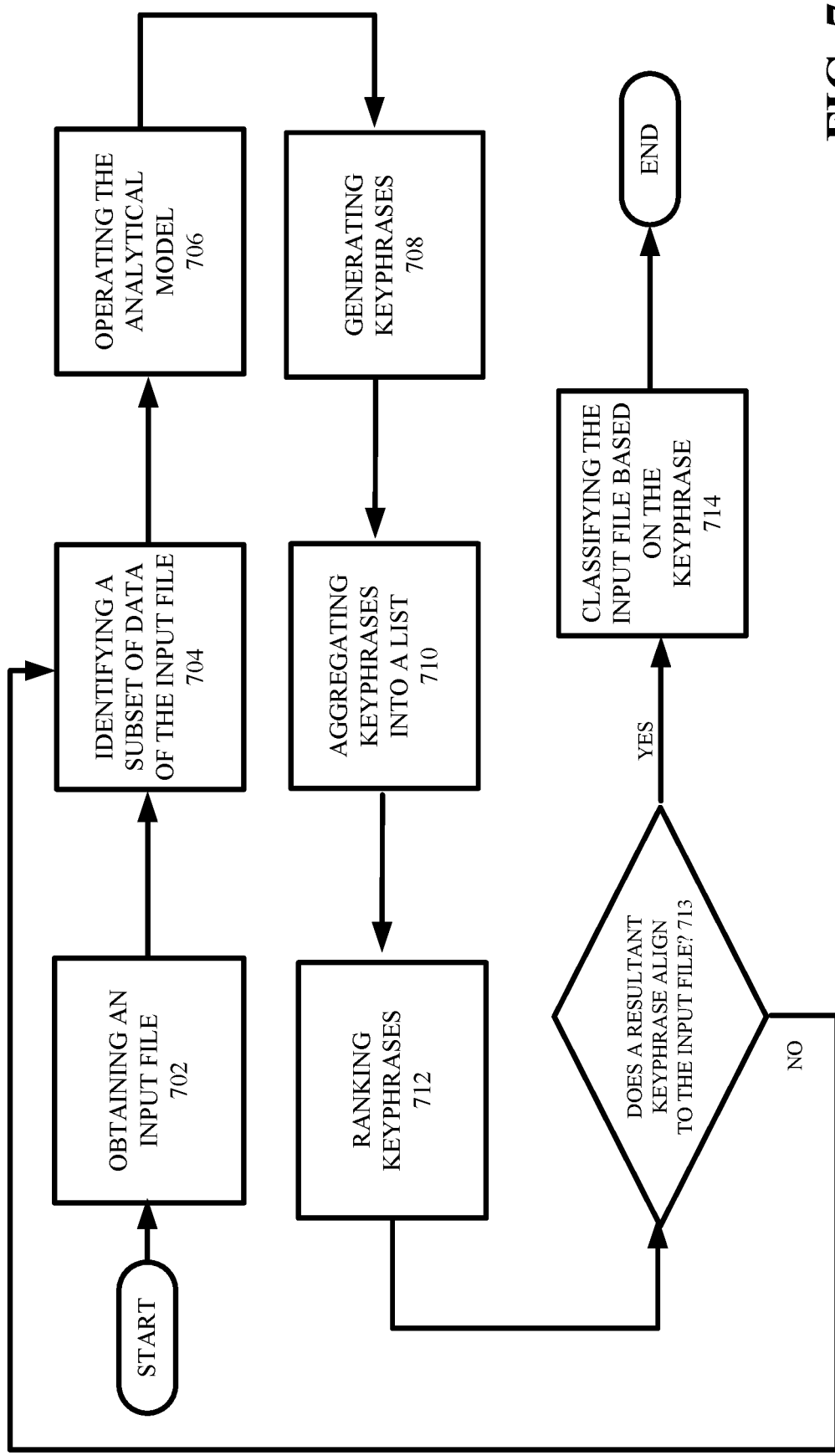
FIG. 7 illustrates a block flow diagram of example processes for assigning keyphrases, employing the non-limiting system of FIG. 2, in accordance with one or more embodiments described herein.

At FIG. 7, an input file keyphrase assignment method 700 can comprise one or more processes that can be performed by the ranking component 218, and also by the obtaining component 210 and generating component 216, are illustrated. That is, as noted above, based on the initial output keyphrases 620, the ranking component 218 can perform one or more processes to assist the generating component 216 in outputting an output keyphrase 280.

For example, at step 702, an input file 228 can be obtained by the obtaining component 210. At step 704, the generating component 216 and/or analytical model 222 can identify at least a first subset of data of the input file 228. The analytical model 222, such as using a Seq2Seq model, can be operated at step 706. As a result, as just previously discussed, context can be derived from the first subset of data, which context can be related, by the analytical model 222, to one or more keyphrases on which the analytical model 222 has been trained. At step 710, the generating component 216 can aggregate the determined keyphrases (e.g., the initial output keyphrases 620) into a list, such as the list 622 of initial output keyphrases 620 at FIG. 6.

Turning now to the ranking component 218, this component can rank the initial output keyphrases, such as based on calculated informative scores for the initial output keyphrases, at step 712. The informative scores can be calculated by the ranking component 218, such as assisted by the analytical model 222. The calculated informative scores can be based on one or more metrics defining data categories comprised by the public repository, as discussed above relative to the cleaning component 214. Put another way, the calculated informative scores can be based on one or more type statistics for the initial output keyphrases/context. The type statistics can comprise frequency of instances of each keyphrase at the list. Here, example type statistics used can comprise number of types, type diversity, average type distance and/or maximum type distance.

At step 713, the generating component 216, based on the rankings, can determine whether a resultant keyphrase aligns to the input file 228. As used herein, the term "align" can refer to having a high enough ranking that satisfies a positive threshold and/or does not satisfy a negative threshold. As used herein, "satisfy" can refer to meeting and/or exceeding/bypassing. Where the answer is yes, the method 700 can proceed to step 714. Where the answer is no, the method 700 can proceed back to step 704 for further identification of data (e.g., a second subset of data) of the input file 228.

At step 714, the method 700 can comprise classifying the input file, such as by the execution component 220, based on the selected output keyphrase 280. The selected output keyphrase 280 can be selected by the generating component 216, such as being a keyphrase of the initial output keyphrases 620 having a highest ranking from the ranking component 218.

That is, turning to FIG. 8, exemplary operations that can be at least partially performed and/or facilitated by the execution component 220 are illustrated. The execution component 220 can, in response to the output of one or more output keyphrases 280 perform one or more operations which can be related to a query augmentation 292 and/or a document system execution 290, among one or more other processes.

As illustrated at FIG. 8, one or more exemplary uses 820 of the output keyphrase 280 (e.g., classifications of the input file 228 based on the output keyphrase 280), output by the analytical model 222 and/or generating component 216 can comprise file organization, query augmentation 292, quality policy alignment, storage policy alignment, increased storage efficiency, globally-accepted (e.g., organization-wide) keyphrases.

The classification can comprise organizing of the input files, storing of the input files, aligning of the input files to one or more policies (e.g., quality and/or storage policies) and/or more generally labeling the input files based on a single classification scheme.

In one or more embodiments, an input file can comprise a query of any database, wherein the query can be augmented employing the keyphrase generation framework described herein. Based on the augmentation, the query can be modified to more particularly align to a database being searched (e.g., query augmentation 292). In an example, a query to a search engine can be expanded by adding the keyphrases generated by the model using the query itself as input.

In one or more embodiments, the classifying can be employed for one or more trend detection purposes. For example, trend detection can refer to detecting how an input file, such as a document, can evolve over time and/or how a program, application, virus, etc. evolves over time based on related files.

Figure 9:
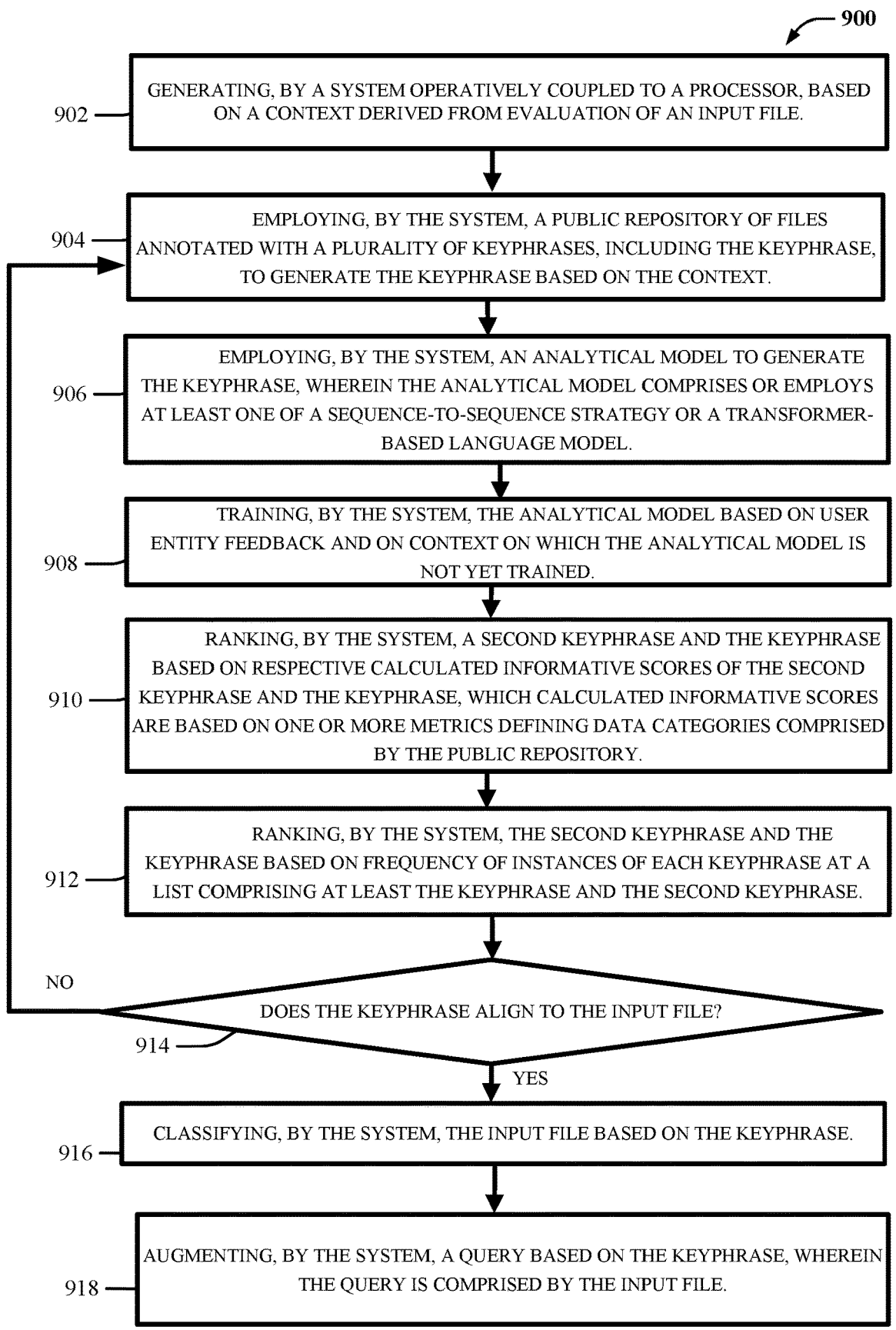
FIG. 9 illustrates a flow diagram of one or more processes that can be performed by the non-limiting system of FIG. 2, in accordance with one or more embodiments described herein.

Referring next to FIG. 9, illustrated is a flow diagram of an example, non-limiting method 900 that can provide a process to port and translate an original quantum source code for execution at a target quantum system, in accordance with one or more embodiments described herein, such as the non-limiting system 200 of FIG. 2. While the non-limiting method 900 is described relative to the non-limiting system 200 of FIG. 2, the non-limiting method 900 can be applicable also to other systems described herein, such as the non-limiting system 100 of FIG. 1. Repetitive description of like elements and/or processes employed in respective embodiments is omitted for sake of brevity.

At 902, the non-limiting method 900 can comprise generating, by a system operatively coupled to a processor (e.g., generating component 216), based on a context derived from evaluation of an input file, wherein the generating component employs a public repository of files annotated with a plurality of keyphrases, including the keyphrase, to generate the keyphrase based on the context. In one or more embodiments, the public repository can comprise or be comprised by an internet encyclopedic website.

At 904, the non-limiting method 900 can comprise employing, by the system (e.g., generating component 216) prior to performing translating, a constraint of the configuration as a constraint of a hardware configuration or as a constraint of a software configuration of the target quantum system.

At 906, the non-limiting method 900 can comprise employing, by the system (e.g., generating component 216), an analytical model (e.g., analytical model 222) to generate the keyphrase, wherein the analytical model comprises or employs at least one of a sequence-to-sequence strategy or a transformer-based language model.

At 908, the non-limiting method 900 can comprise training, by the system (e.g., training component 224), the analytical model based on user entity feedback and on context on which the analytical model is not yet trained.

At 910, the non-limiting method 900 can comprise ranking, by the system (e.g., ranking component 218), a second keyphrase and the keyphrase based on respective calculated informative scores of the second keyphrase and the keyphrase, which calculated informative scores are based on one or more metrics defining data categories comprised by the public repository.

At 912, the non-limiting method 900 can comprise ranking, by the system (e.g., ranking component 218), the second keyphrase and the keyphrase based on frequency of instances of each keyphrase at a list comprising at least the keyphrase and the second keyphrase.

At 914, the non-limiting method 900 can comprise determining, by the system (e.g., execution component 220), whether the keyphrase aligns to the input file. If the answer is yes, the non-limiting method 900 can proceed to step 916. If the answer is no, the non-limiting method can proceed back to step 904 for additional gathering of additional data from a public repository.

At 916, the non-limiting method 900 can comprise classifying, by the system (e.g., execution component 220), the input file based on the keyphrase.

At 918, the non-limiting method 900 can comprise augmenting, by the system (e.g., execution component 220), a query based on the keyphrase, wherein the query is comprised by the input file.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to a process for generating the classification of files to allow for file system organization and/or query augmentation. A system can comprise a memory that stores computer executable components, and a processor that executes the computer executable components stored in the memory, wherein the computer executable components can comprise a generating component that generates a keyphrase based on a context derived from evaluation of an input file, wherein the generating component employs a public repository of files annotated with a plurality of keyphrases, including the keyphrase, to generate the keyphrase based on the context, and an execution component that classifies the input file based on the keyphrase. In one or more embodiments, the input file can comprise a query, and classification of the input file can comprise augmenting the query based on the keyphrase.

An advantage of the aforementioned system, computer-implemented method and/or computer program product can be providing for more reliable and globally accepted file classification based on readily available, free, and public keyphrase sets. Such framework can allow for quicker and more reliable training of a keyphrase generation model, while providing a training set of sufficient size.

In one or more embodiments of the aforementioned system, computer-implemented method and/or computer program product, the public repository of files can comprise or be comprised by an internet encyclopedic website. An advantage of this feature can be readily available, free, and public data for use in generating keyphrases.

In one or more embodiments of the aforementioned system, computer-implemented method and/or computer program product, the input file can comprise a query, and classification of the input file can comprise augmenting the query based on the keyphrase. An advantage of these features can be streamlining of querying based on a widely used classification framework.

Indeed, in view of the one or more embodiments described herein, a practical application of the one or more systems, computer-implemented methods and/or computer program products described herein can be ability to augment a query and/or classify a file (e.g., a document) based on context of the query and/or file, which context can comprise data and/or metadata of or underlying a file, and which context can be employed to generate keyphrases based on public repository keyphrase datasets. Such is a useful and practical application of computers, thus providing enhanced (e.g., improved and/or optimized) querying and/or file searching operations. Overall, such computerized tools can constitute a concrete and tangible technical improvement in the fields of keyphrase generation, query augmentation and/or file classification.

Furthermore, one or more embodiments described herein can be employed in a real-world system based on the disclosed teachings. For example, one or more embodiments described herein can function with a query system, storage system and/or file management system that can receive as input a query and/or file, and which as an output can provide an output keyphrase which can be employed for query augmentation, file storage modification and/or file organization modification.

Moreover, a device and/or method described herein can be implemented in one or more domains to enable scaled source code translations. Indeed, use of a system as described herein can be scalable, such as where plural inputs (e.g., files and/or queries) can be evaluated and output keyphrases assigned at least partially at a same time as one another. Additionally, and/or alternatively, plural keyphrases can be assigned and/or ranked for a single input, at least partially at a same time as one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to keyphrase generation, as compared to existing systems and/or techniques. Systems, computer-implemented methods and/or computer program products providing performance of these processes are of great utility in the fields of keyphrase generation, query augmentation and/or file classification, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically train a keyphrase generation computer model, evaluate an input (e.g., file and/or query) for context comprised by underlying data and/or metadata, and/or classify the input based on one or more output keyphrases as the one or more embodiments described herein can provide this process. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Figure 10:
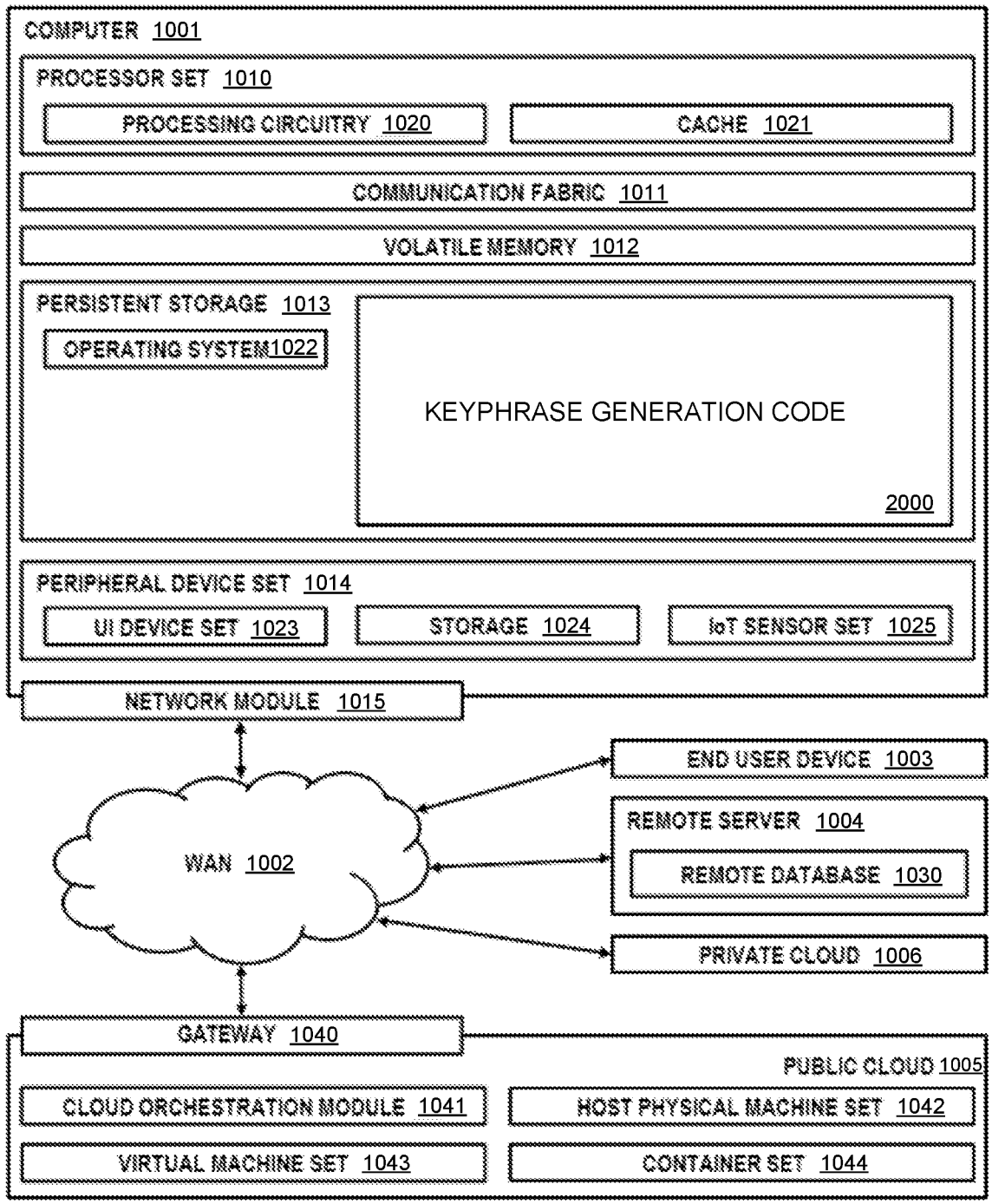
FIG. 10 illustrates a block diagram of example, non-limiting, computer environment in accordance with one or more embodiments described herein.

Turning next to FIG. 10, a detailed description is provided of additional context for the one or more embodiments described herein at FIGS. 1-9.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the keyphrase generation code 2000. In addition to block 2000, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 2000, as identified above), peripheral device set 1014 (including user interface (UI), device set 1023, storage 1024, and Internet of Things (IOT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 2000 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface type operating systems that employ a kernel. The code included in block 2000 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine that collects and stores helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs)

typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions. While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

The invention claimed is:

1. A system, comprising:
 a memory that stores computer executable components; and
 a processor that executes the computer executable components stored in the memory, wherein the computer executable components comprise:
  a training component that trains an analytical model to generate keyphrases for input texts, wherein the training comprises:
   for respective files in a public repository, wherein the respective files comprise text:
    extract paragraphs from the text of the file,
    extract a list of keyphrases from all of the text of the file, and
    for each of the paragraphs:
     generate a sequence-to-sequence instance comprising the paragraph as a source and the list of keyphrases from all of the text of the file as a target, and
     add the sequence-to-sequence instance to a set of sequence-to-sequence instances; and
    training, using the set of sequence-to-sequence instances, the analytical model to generate the keyphrases for s;
  a generating component that generates, using the analytical model, a keyphrase based on a context derived from evaluation of an input text; and
  an execution component that classifies the input text file based on the keyphrase.

2. The system of claim 1, wherein the public repository of files is part of an internet encyclopedic website.

3. The system of claim 1, wherein the input text file comprises a query, and wherein classification of the input text file comprises augmenting the query based on the keyphrase.

4. The system of claim 1, wherein the generating component further generates a second keyphrase, and aggregates the second keyphrase and the keyphrase, into a list, and wherein the system further comprises a ranking component that ranks the second keyphrase and the keyphrase based on frequency of instances of each keyphrase at the list.

5. The system of claim 1, wherein the analytical model comprises a transformer-based language model.

6. The system of claim 5, wherein the training component trains the analytical model based further on at least one of user entity feedback or contexts on which the analytical model is not yet trained.

7. The system of claim 1, wherein the generating component further generates a second keyphrase, and ranks the second keyphrase and the keyphrase based on respective calculated informative scores of the second keyphrase and the keyphrase, which calculated informative scores are based on one or more metrics defining data categories comprised by the public repository.

8. A computer-implemented method, comprising:
 training, by a system operatively coupled to a processor, an analytical model to generate keyphrases for input texts, wherein the training comprises:
  for respective files in a public repository, wherein the respective files comprise text:
   extract paragraphs from the text of the file,
   extract a list of keyphrases from all of the text of the file, and
   for each of the paragraphs:
    generate a sequence-to-sequence instance comprising the paragraph as a source and the list of keyphrases from all of the text of the file as a target, and
    add the sequence-to-sequence instance to a set of sequence-to-sequence instances; and training, using the set of sequence-to-sequence instances, the analytical model to generate the keyphrases for the input texts;
generating, by the system, a keyphrase based on a context derived from evaluation of an input text; and
classifying, by the system, the input text file based on the keyphrase.

9. The computer-implemented method of claim 8, wherein the public repository is part of an internet encyclopedic website.

10. The computer-implemented method of claim 8, wherein the input text comprises a query, and wherein the classifying comprises augmenting, by the system, the query based on the keyphrase.

11. The computer-implemented method of claim 8, further comprising:
generating, by the system, a second keyphrase;
aggregating, by the system, the second keyphrase and the keyphrase, into a list; and
ranking, by the system, the second keyphrase and the keyphrase based on frequency of instances of each keyphrase at the list.

12. The computer-implemented method of claim 8, wherein the analytical model comprises a transformer-based language model.

13. The computer-implemented method of claim 12, further comprising:
training, by the processor, the analytical model based further on at least one of user entity feedback or contexts on which the analytical model is not yet trained.

14. The computer-implemented method of claim 8, further comprising:
generating, by the system, a second keyphrase; and
ranking, by the system, the second keyphrase and the keyphrase based on respective calculated informative scores of the second keyphrase and the keyphrase, which calculated informative scores are based on one or more metrics defining data categories comprised by the public repository.

15. A computer program product facilitating classifying input texts, the computer program product comprising a computer readable storage medium having program instructions embodied therewith, the program instructions executable by a processor to cause the processor to:
train, by the processor, an analytical model to generate keyphrases for input texts, wherein the training comprises:
for respective files in a public repository, wherein the respective files comprise text:
extract paragraphs from the text of the file,
extract a list of keyphrases from all of the text of the file, and
for each of the paragraphs:
generate a sequence-to-sequence instance comprising the paragraph as a source and the list of keyphrases from all of the text of the file as a target, and
add the sequence-to-sequence instance to a set of sequence-to-sequence instances; and
training, using the set of sequence-to-sequence instances, the analytical model to generate the keyphrases for the input texts;
generate, by the processor, a keyphrase based on a context derived from evaluation of an input text; and
classify, by the processor, the input text file based on the keyphrase.

16. The computer program product of claim 15, wherein the public repository is part of an internet encyclopedic website.

17. The computer program product of claim 15, wherein the input text comprises a query, and wherein the program instructions are further executable by the processor to cause the processor to augment, by the processor, the query based on the keyphrase.

18. The computer program product of claim 15, wherein the program instructions are further executable by the processor to cause the processor to:
generate, by the processor, a second keyphrase;
aggregate, by the processor, the second keyphrase and the keyphrase, into a list; and
rank, by the processor, the second keyphrase and the keyphrase based on frequency of instances of each keyphrase at the list.

19. The computer program product of claim 15 wherein the analytical model comprises a transformer-based language model.

20. The computer program product of claim 15, wherein the program instructions are further executable by the processor to cause the processor to:
generate, by the processor, a second keyphrase; and
rank, by the processor, the second keyphrase and the keyphrase based on respective calculated informative scores of the second keyphrase and the keyphrase, which calculated informative scores are based on one or more metrics defining data categories comprised by the public repository.

* * * * *